March 4, 1941.  B. H. TODD ET AL  2,233,499
INTERNAL COMBUSTION ENGINE
Filed June 6, 1939    8 Sheets-Sheet 1

INVENTORS
ELMER E. PUDGE
BRUCE H. TODD
JOHN F. JOHNSON
BY
ATTORNEY.

March 4, 1941.　　B. H. TODD ET AL　　2,233,499
INTERNAL COMBUSTION ENGINE
Filed June 6, 1939　　8 Sheets-Sheet 2

INVENTORS
ELMER E. PUDGE
BRUCE H. TODD
JOHN F. JOHNSON
BY　　ATTORNEY.

March 4, 1941.   B. H. TODD ET AL   2,233,499
INTERNAL COMBUSTION ENGINE
Filed June 6, 1939   8 Sheets-Sheet 6

INVENTORS.
ELMER E. PUDGE.
BRUCE H. TODD
JOHN F. JOHNSON
BY
ATTORNEY.

Patented Mar. 4, 1941

2,233,499

UNITED STATES PATENT OFFICE 2,233,499

INTERNAL COMBUSTION ENGINE

Bruce H. Todd and John F. Johnson, Denver, and Elmer E. Pudge, Colorado Springs, Colo.

Application June 6, 1939, Serial No. 277,636

1 Claim. (Cl. 123—51)

This invention relates to an internal combustion engine and more particularly to an internal combustion engine for aircraft use.

The principal object of the invention is to provide an internal combustion engine which will provide a relatively large ratio of expansion with a relatively short crank stroke and a relatively small cylinder diameter so that the maximum expansion with a resultant increase in efficiency may be obtained without increasing the size or weight of the engine.

Other objects are: to provide an internal combustion engine in which all crank actions will be continuously balanced by corresponding crank reactions so that vibration will be reduced; to provide an internal combustion engine design which will present a minimum of head resistance to an aircraft; to provide a two-cycle, opposed piston engine of the most efficient design; to provide a construction which will enable the engine to be quickly and easily assembled and disassembled and in which the cylinders can be easily removed and ground as independent units; to provide a two cycle construction in which the incoming gases will completely scavenge the cylinder; and to provide an engine in which the most efficient crank shaft speed can be had with any desired speed at the power shaft.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

The improved motor comprises: a single, unitary motor block 10 closed at its right and left sides by means of side crank cases 11 and 12 respectively. A series of cylinder liners 13 (three being shown) extend laterally across the motor block in parallel relation, and are open at both their extremities to the interior of the crank cases 11 and 12. Within the crank case 11, a crank shaft 15 is journalled and within the crank case 12, a similar crank shaft 14 is journalled. The axes of the crank shafts lie in a common plane with the axes of the series of cylinder liners 13.

A pair of pistons is mounted in each liner. On the drawing, the pistons on the left side of the engine will be designated by the reference characters 17, and the pistons on the right side will be designated by the reference characters 18. Each crank shaft carries a series of cranks corresponding in number to the number of cylinder liners and each crank is connected by means of a connecting rod 16 to one of the pistons.

The crank shafts 14 and 15 terminate in drive pinions 19 and 20 respectively. The pinions 19 and 20 are in constant mesh with a main gear 21 journalled at the forward extremity of the motor block in suitable bearings 22. The pinions and gear are enclosed in a gear case 23 bolted to the front of the engine block and carrying a second bearing 24 supporting a main power shaft 25 of the motor to which the main gear 21 is secured.

Figure 1:
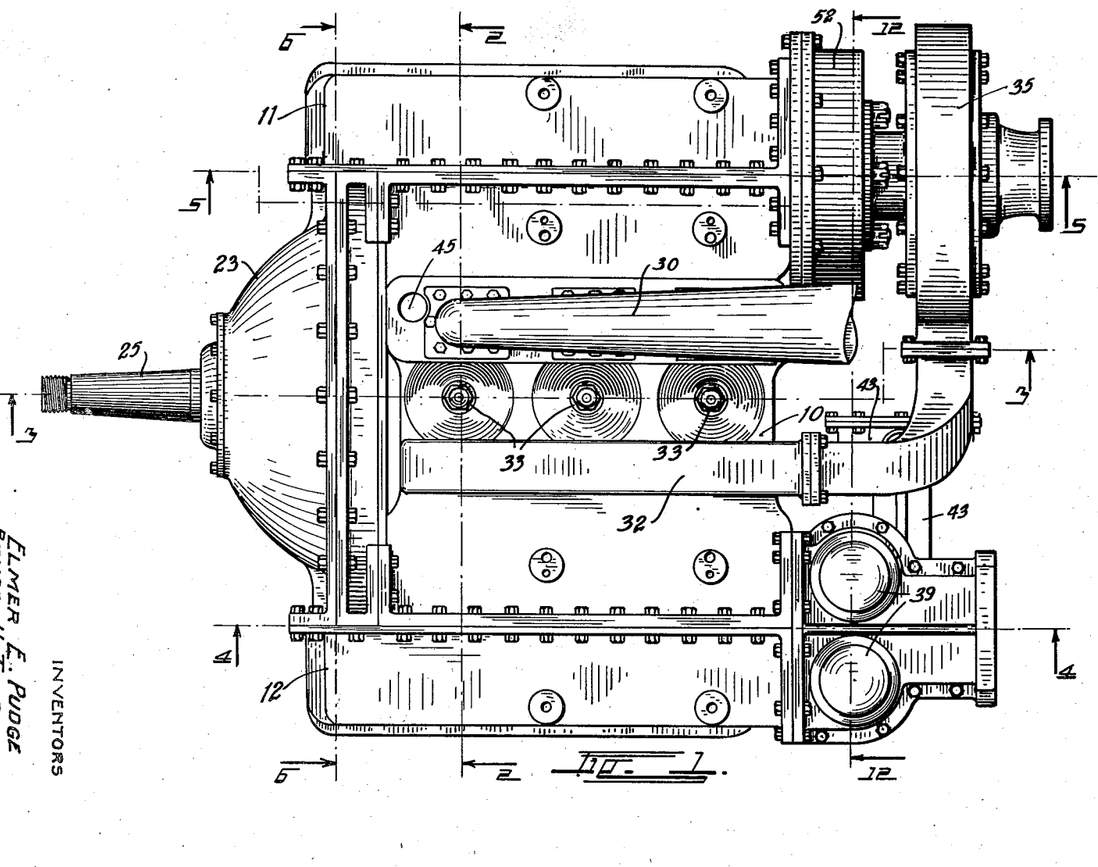
Fig. 1 is a top plan view of the improved engine.
Figure 2:
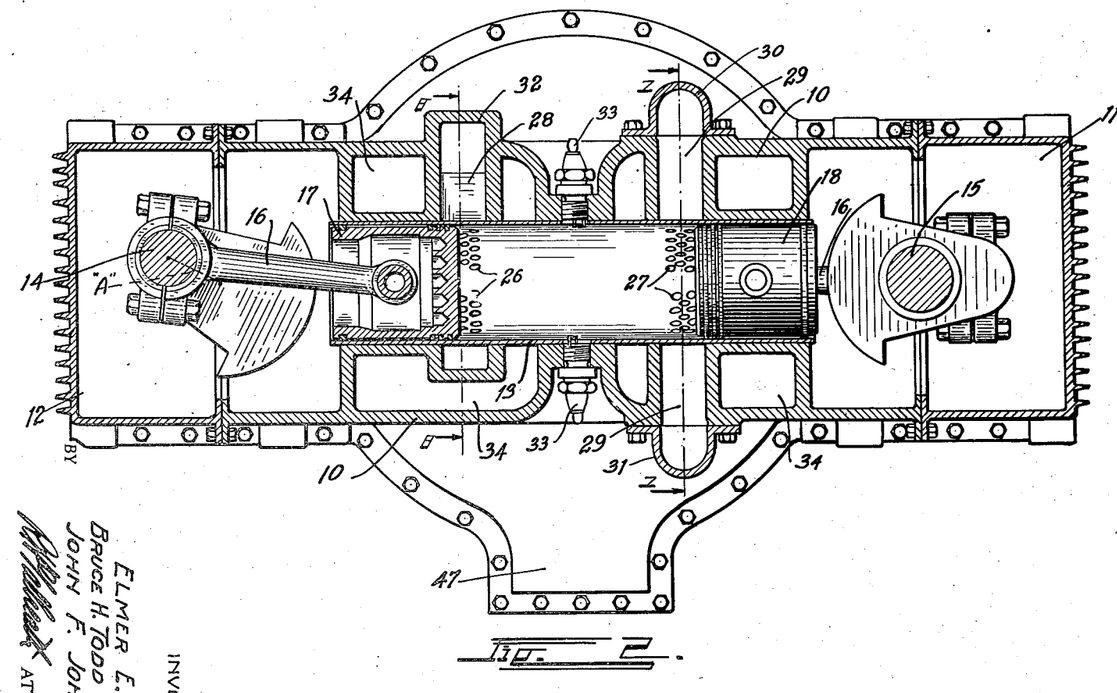
Fig. 2 is a cross section therethrough, taken on the line 2—2, Fig. 1.
Figure 3:
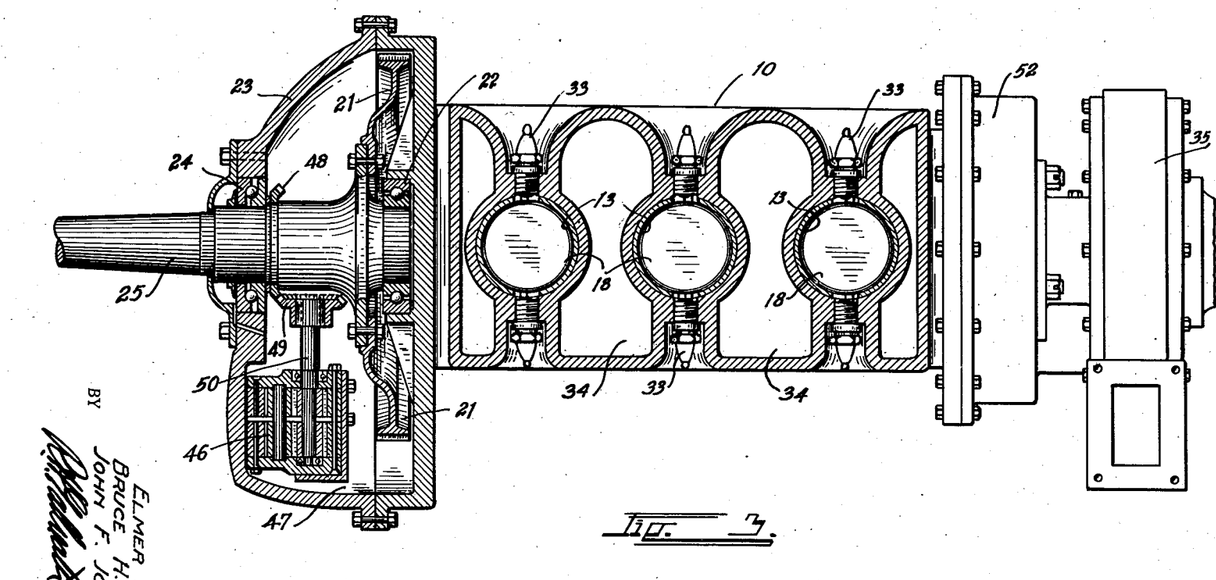
Fig. 3 is a longitudinal section, taken on the line 3—3, Fig. 1.
Figure 4:
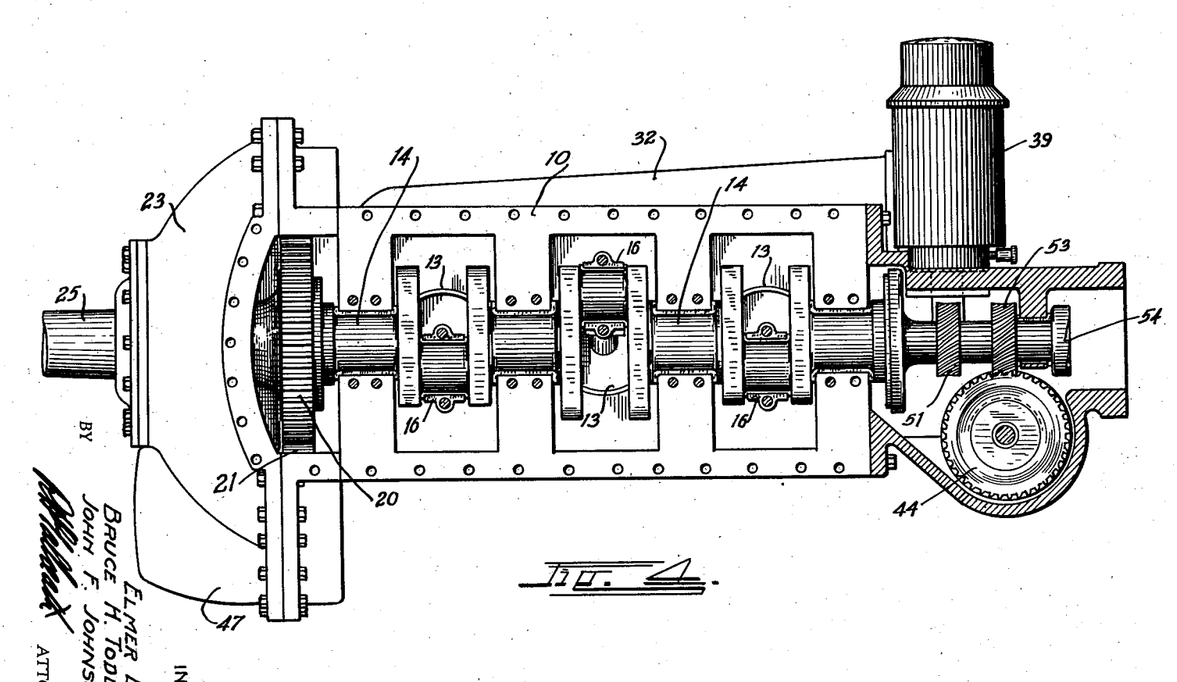
Fig. 4 is a side elevation thereof with the left side crank case cover removed on line 4—4, Fig. 1.
Figure 5:
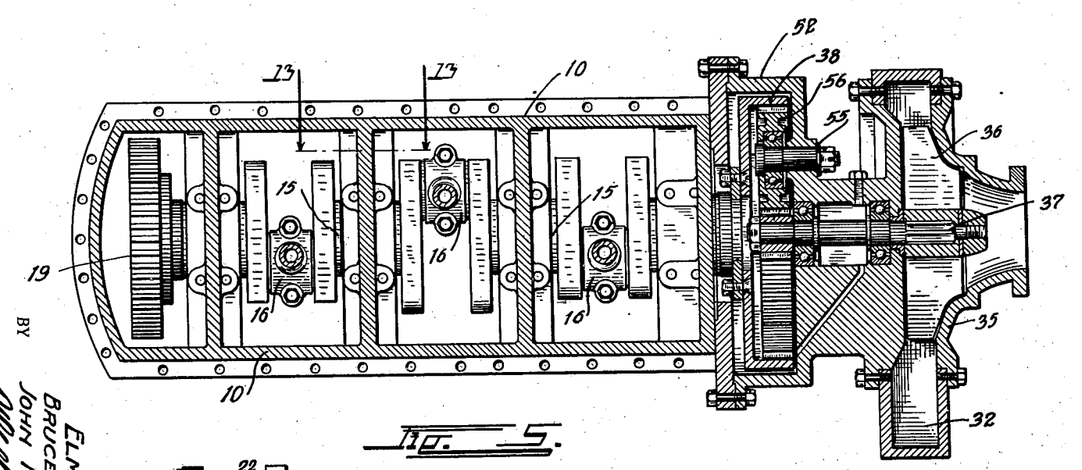
Fig. 5 is a longitudinal section through the right side crank case, taken on the line 5—5, Fig. 1.
Figure 6:
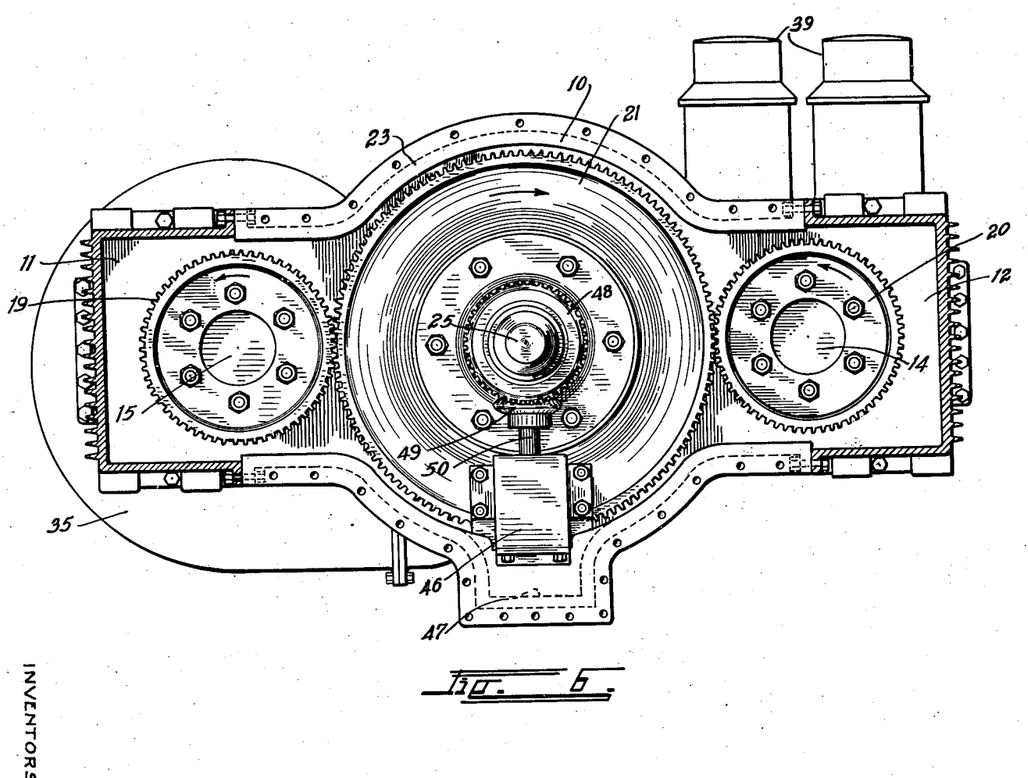
Fig. 6 is an enlarged detail view partially in section with the gear cover removed to expose the drive gears. This view is taken on the line 6—6, Fig. 1.

It can be readily seen that this arrangement forces the two crank shafts to rotate in unison at the same speed and in the same direction. The cranks on the two crank shafts are arranged in almost exact opposition so that the two pistons 17 and 18 in each cylinder liner will move away from and approach each other simultaneously. The crank shafts, however, are slightly offset from each other, as indicated by the angle A in Fig. 2, so that the pistons 17 will reach the outer extremity of their strokes before the pistons 18 reach the outer extremity of theirs.

The pistons 17 control a series of intake ports 26 and the pistons 18 control a series of exhaust ports 27 extending through the cylinder liners 13. The two series of ports 26 and 27 are equally spaced from the vertical center line of the piston liners 13 but due to the offset angle A the pistons 18 will open the ports 27 before the pistons 18 open the ports 26.

Figure 7:
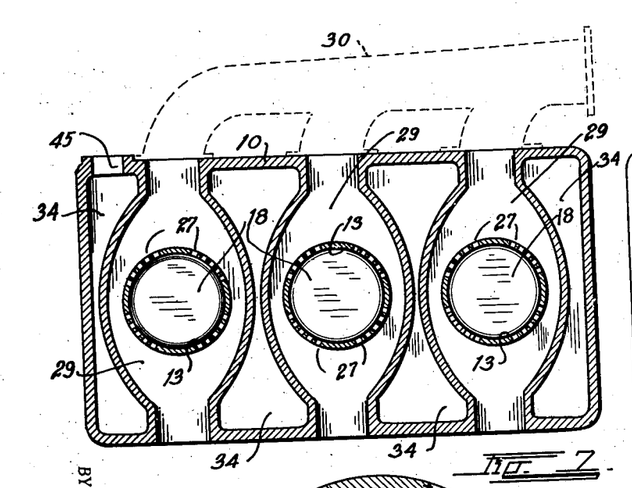
Fig. 7 is a cross section through the engine block, taken on the line 7—7, Fig. 2.
Figures 8, 9, 11:
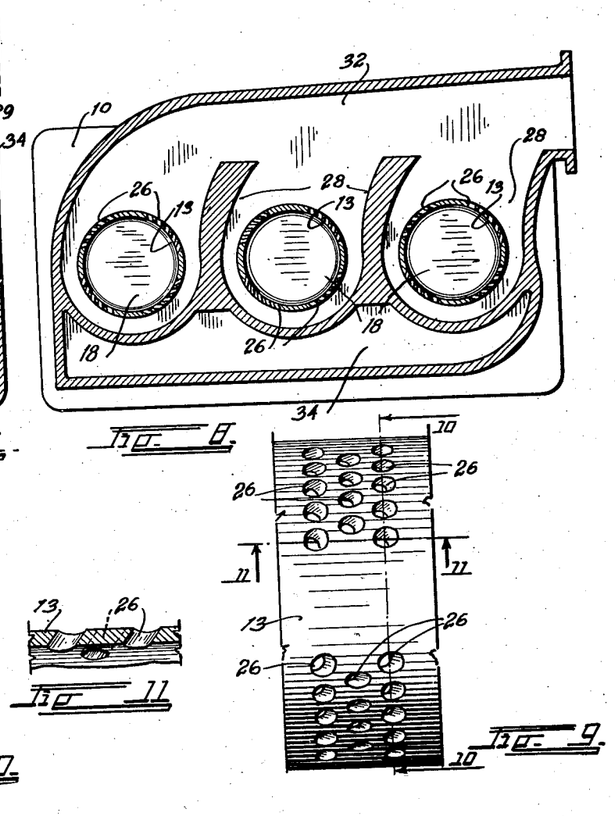
Fig. 8 is a similar cross section, taken on the line 8—8, Fig. 2.
Fig. 9 is a detail view of a cylinder sleeve illustrating the position of the ports therein.
Fig. 11 is a detail cross section through the cylinder sleeve, taken on the line 11—11, Fig. 9.

The ports 26 communicate with an intake passage 28, shown in detail in Fig. 8, and the exhaust ports 27 communicate with an exhaust passage 29, shown in detail in Fig. 7. The exhaust passage 29 communicates with suitable exhaust manifolds 30 and 31 above and below the motor block 10. The intake passage 28 communicates with an intake manifold 32 which extends longitudinally of the engine and laterally of the piston liners.

A pair of spark lugs 33 are positioned at the mid point of each cylinder liner 13 and extend through the cylinder liners. The motor block 10 is formed with cooling water passages 34 surrounding the cylinder liners 13 and the intake and exhaust passages therein.

The gas for combustion is supplied from any suitable carburetor (not shown) to the intake manifold 32 and from thence through the passages 36 to the cylinder liners. This gas is always under pressure from a pressure blower or supercharger 35, within which a rotor 36 is supported upon the extremity of a supercharger shaft 37. The supercharger shaft is driven from a relatively large internal drive gear 38, on the crank shaft 15, which rotates a series of fixed planet gears 56. The gears 56 are in constant mesh with a drive pinion 55 on the supercharger shaft 37. Thus, the rotor 36 is rotated at greatly increased speed over the crank shaft so as to force the gas into the cylinders under considerable pressure. The gears 38, 55 and 56 are contained within a gear case 52, which also serves to support the supercharger 35 from the motor block 10.

The crank shaft 14 rotates the armatures of a pair of magneto distributors 39 for furnishing the sparking current to the spark plugs 33, there being one magneto for each set of plugs so that in case of magneto failure or circuit shorts the other set of plugs will function. The magnetos are driven from a spiral drive gear 51 on the crank shaft 14 which meshes with a spiral driven gear 41 on each of the armature shafts of the magnetos.

A second spiral gear 53 on the crank shaft 14 drives a water pump rotor 42 within a water pump housing 43, through the medium of a third spiral driven gear 44. The water pump is connected by means of suitable hoses or other conduits with suitable water nipples 45 communicating with the water jacket spaces 34. The gears 41, 44, 51 and 53 are contained within a gear housing 57 which also serves as a support for the magnetos 39 and the water pump 43.

The engine is lubricated from an oil pump 46 which is mounted in an oil sump 47 at the head of the motor and driven from a bevel gear 48 on the main power shaft 25. The gear 48 meshes with a second bevel gear 49 on a shaft 50 of the oil pump. The oil from the oil pump is conducted through suitable conductors to the various bearing surfaces in the motor as is usual in internal combustion engine practise.

Figure 10:
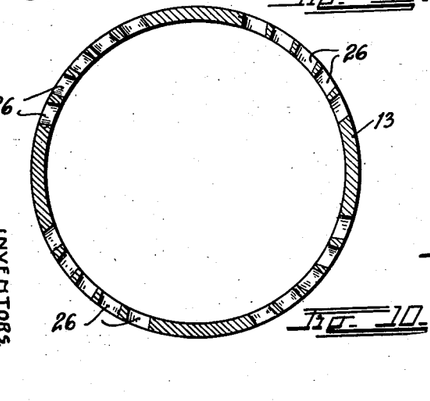
Fig. 10 is a cross section therethrough, taken on the line 10—10, Fig. 9.
Figure 12:
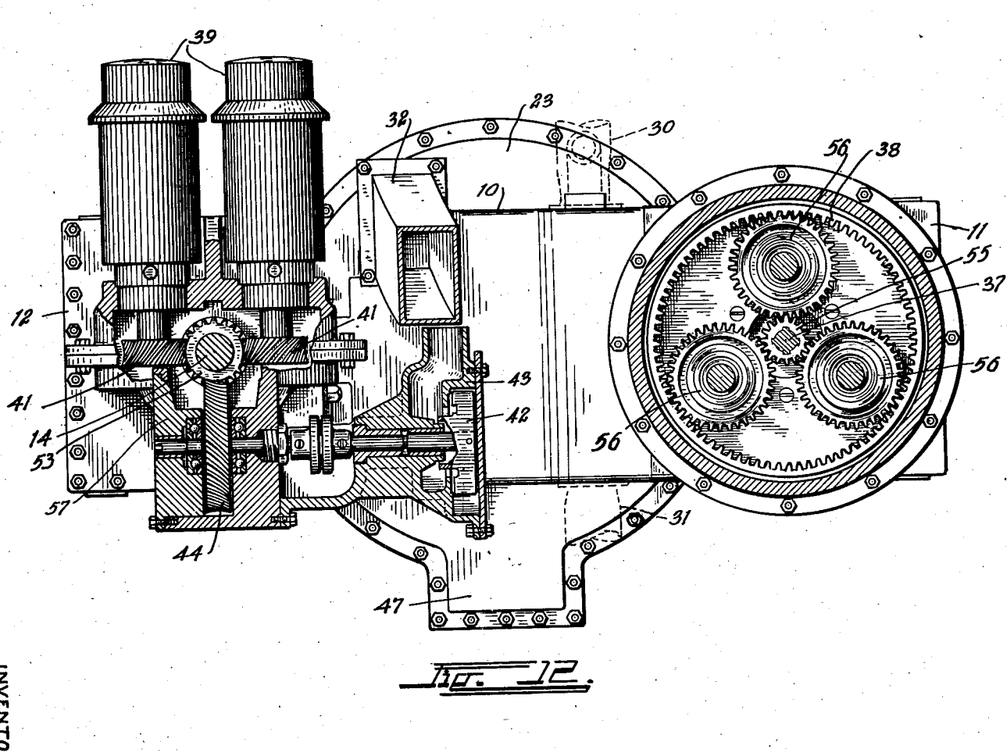
Fig. 12 is a cross section through the engine, taken on the line 12—12, Fig. 1.
Figure 13:
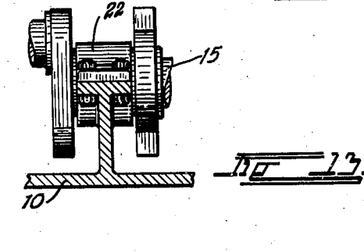
Fig. 13 is a detail section illustrating a crank shaft bearing, taken on the line 13—13, Fig. 5.

It is desired to call particular attention to the fact that the ports 26 and 27 are drilled through the cylinder liners on a double incline, that is, on a tangential angle, as shown in Fig. 10, and on a second angle to the axes of the cylinder liners, as shown in Fig. 11. This causes the incoming gases to enter the cylinder in a whirling spiral form which completely scavenges the burned gases from the cylinder. The latter gases are easily picked up by the exhaust ports due to the inclined tangential angle thereof so as to whirl the exhaust gases completely from the cylinder into the exhaust passages 29.

The cycle of operation of the motor is similar, in general, to the operation of any two-cycle internal combustion engine. There is a constant pressure of fuel gas in the intake passages 28. As the ports 26 are uncovered by each piston 17 in succession, this gas will be forced into the cylinder liners sweeping the exhaust gases ahead through the ports 27. The two pistons 17 and 18 then approach each other until the inner extreme of their travel is reached at which time the spark plugs will ignite the compressed charge forcing the two pistons oppositely outward and rotating the two crank shafts 14 and 15.

The piston 18 will first uncover the exhaust port 27 allowing the residual pressure in the cylinder liner to initially force the exhaust gases into the exhaust passages 29 and from thence into the exhaust manifolds 30 and 31. The intake ports will then be opened by the piston 17 to intake fresh gas and the compression and explosion cycle will be repeated.

It is desired to call attention to the fact that the piston liners 13 are of a wear resisting metal such as iron or steel as they are relatively thin and do not add excessive weight. The remainder of the block and the crank cases is cast from a light weight metal or alloy such as aluminium, magnesium alloy, and similar metal as there are no excessive stresses imposed thereon.

The liner may be secured in place in any desired manner in the block. It has been found that if the block is shrunk on the liners they will be securely held in place, as there are no forces in the engine which would tend to displace them.

The crank shaft is formed with a starter coupling 54 at its rearward extremity and the housing 57 is formed at this point for the reception and support of a standard starter motor.

It will be noted that ratio of the gears 19, 20 and 21 may be so arranged that the main or propellor shaft 25 will rotate at the most efficient speed for any given propellor, while the crank shafts 14 and 16 are rotating at the most efficient speeds for the characteristics of the particular engine design. The power shaft can be arranged to travel at any desired speed either faster or slower than the crank shafts.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

In an internal combustion engine of the opposed piston type, a motor block; a cylinder in said block; a plurality of parallel cylinder passages passing through and opening to both extremities of said cylinder; an exhaust passage surrounding each of said cylinder passages adjacent their one extremity and extending transversely thereof; an intake passage surrounding said cylinder passage adjacent the other extremity of the latter and extending transversely thereof; spark plugs in said cylinder of the motor block at the mid-points of said cylinder passages; a cylinder liner extending throughout the entire length of the cylinder, each cylinder liner having three sets of perforations in its length, two sets corresponding to the positions of the exhaust and intake passages respectively and one set corresponding to the position of said spark plugs; and opposed pistons operating in the opposite ends of each cylinder liner.

BRUCE H. TODD.
JOHN F. JOHNSON.
ELMER E. PUDGE.